United States Patent
Oshima et al.

(10) Patent No.: US 10,104,281 B2
(45) Date of Patent: Oct. 16, 2018

(54) MOVING IMAGE EDITING DEVICE, MOVING IMAGE EDITING METHOD, MOVING IMAGE EDITING PROGRAM

(71) Applicant: FUJIFILM Corporation, Tokyo (JP)

(72) Inventors: Hiroyuki Oshima, Saitama (JP); Mikio Watanabe, Saitama (JP); Takeshi Misawa, Saitama (JP); Masaya Tamaru, Saitama (JP); Daisuke Hayashi, Saitama (JP); Fuminori Irie, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 93 days.

(21) Appl. No.: 15/434,850

(22) Filed: Feb. 16, 2017

(65) Prior Publication Data
US 2017/0163880 A1    Jun. 8, 2017

Related U.S. Application Data

(63) Continuation of application No. PCT/JP2015/067871, filed on Jun. 22, 2015.

(30) Foreign Application Priority Data

Sep. 5, 2014 (JP) ................. 2014-181036

(51) Int. Cl.
*H04N 5/232* (2006.01)
*H04M 1/725* (2006.01)
(Continued)

(52) U.S. Cl.
CPC ....... *H04N 5/23216* (2013.01); *G06F 3/0488* (2013.01); *G06F 3/04817* (2013.01);
(Continued)

(58) Field of Classification Search
CPC .......... H04N 5/23216; H04N 5/23293; H04N 5/247; H04N 5/268; H04N 5/23203;
(Continued)

(56) References Cited

U.S. PATENT DOCUMENTS 6,160,544 A * 12/2000 Hayashi ................. H04H 40/18
    348/E5.022
6,208,376 B1 * 3/2001 Tanaka ................... H04N 7/181
    348/143
(Continued)

FOREIGN PATENT DOCUMENTS

JP    5-183862 A     7/1993
JP    2007-201862 A  8/2007
(Continued)

OTHER PUBLICATIONS

International Search Report, issued in PCT/JP2015/067871, dated Aug. 25, 2015.
(Continued)

*Primary Examiner* — Pritham Prabhakher
(74) *Attorney, Agent, or Firm* — Birch, Stewart, Kolasch & Birch, LLP

(57) ABSTRACT

A smartphone which functions as a moving editing device includes: a wireless communication unit that is connected to plural cameras capable of performing moving image capturing in a wireless manner and acquires one or plural live view images from the plural cameras; a display panel that displays the acquired one or plural live view images; an operation panel that performs switching between live view images displayed on the display panel by a manual operation; a storage unit that stores operation history information indicating an operation history in the operation panel; and a main controller which functions as a moving image editing unit that performs moving image editing for automatically creating, after the moving image capturing in the plural
(Continued)

cameras is terminated, one moving image based on plural moving images respectively captured by the plural cameras and the operation history information stored in the storage unit.

16 Claims, 12 Drawing Sheets

(51) Int. Cl.
*H04N 5/247* (2006.01)
*H04N 5/268* (2006.01)
*G06F 3/048* (2013.01)
*G06F 3/0488* (2013.01)
*G06F 3/0481* (2013.01)
*H04N 5/445* (2011.01)
*G06F 3/0484* (2013.01)

(52) U.S. Cl.
CPC ...... *G06F 3/04842* (2013.01); *G06F 3/04845* (2013.01); *H04M 1/72583* (2013.01); *H04N 5/23203* (2013.01); *H04N 5/23293* (2013.01); *H04N 5/247* (2013.01); *H04N 5/268* (2013.01); *H04N 5/44591* (2013.01)

(58) Field of Classification Search
CPC ........... H04N 5/44591; H04M 1/72583; G06F 3/0488; G06F 3/048; G06F 3/04817; G06F 3/04842; G06F 3/04845
USPC .................................................. 348/207.11
See application file for complete search history.

(56) References Cited

U.S. PATENT DOCUMENTS

| | | | | |
|---|---|---|---|---|
| 6,392,658 B1* | 5/2002 | Oura | ...................... | G06T 3/4038 345/473 |
| 7,215,359 B2* | 5/2007 | Hampapur | ............. | H04N 7/181 348/143 |
| 7,424,218 B2* | 9/2008 | Baudisch | ............... | G03B 13/02 348/218.1 |
| 8,848,032 B2* | 9/2014 | Yamaji | ............... | H04N 5/23238 348/36 |
| 8,887,050 B1* | 11/2014 | Siracusano, Jr. | ..... | G06F 3/0481 715/716 |
| 9,172,911 B2* | 10/2015 | Kristiansen | ......... | G06F 3/04883 |
| 2006/0061653 A1* | 3/2006 | Hampapur | ............. | H04N 7/181 348/143 |
| 2007/0025723 A1* | 2/2007 | Baudisch | ............... | G03B 13/02 396/287 |
| 2007/0206100 A1* | 9/2007 | Hikita | .................... | H04N 5/232 348/211.7 |
| 2008/0253683 A1 | 10/2008 | Nakamura et al. | | |
| 2008/0253685 A1* | 10/2008 | Kuranov | ............... | G06T 3/4038 382/284 |
| 2011/0304739 A1 | 12/2011 | Itakura | | |
| 2013/0124471 A1* | 5/2013 | Chen | .................. | H04N 5/23238 707/624 |
| 2014/0229866 A1* | 8/2014 | Gottlieb | ................ | H04L 65/403 715/758 |
| 2015/0264202 A1* | 9/2015 | Pawlowski | ........ | H04N 1/00106 348/207.11 |

FOREIGN PATENT DOCUMENTS

| | | |
|---|---|---|
| JP | 2007-281966 A | 10/2007 |
| JP | 2008-270903 A | 11/2008 |
| JP | 2009-303244 A | 12/2009 |
| JP | 2011-259365 A | 12/2011 |
| JP | 2013-123171 A | 6/2013 |

OTHER PUBLICATIONS

Written Opinion of the International Searching Authority (PCT/ISA/237), issued in PCT/JP2015/067871, dated Aug. 25, 2015.

* cited by examiner

FIG. 6
<FRAME POSITION>
(1)
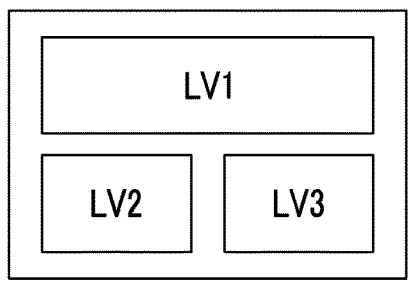
(2)
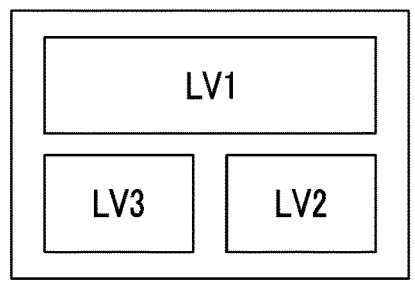
(3)
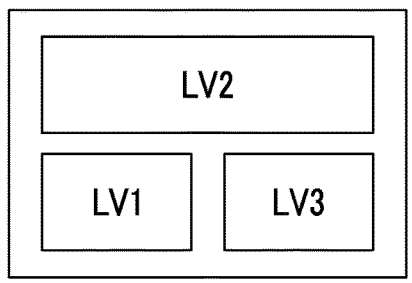
(4)
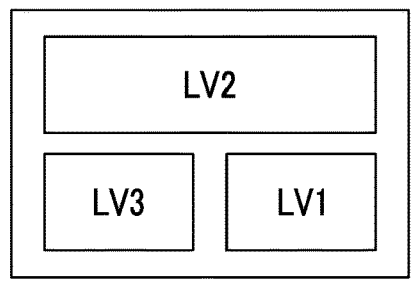
(5)
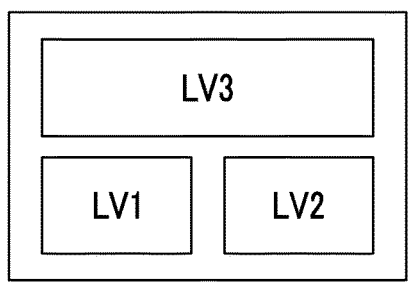
(6)
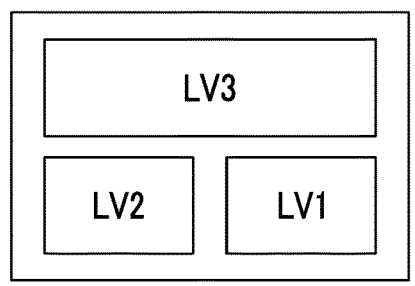

FIG. 7
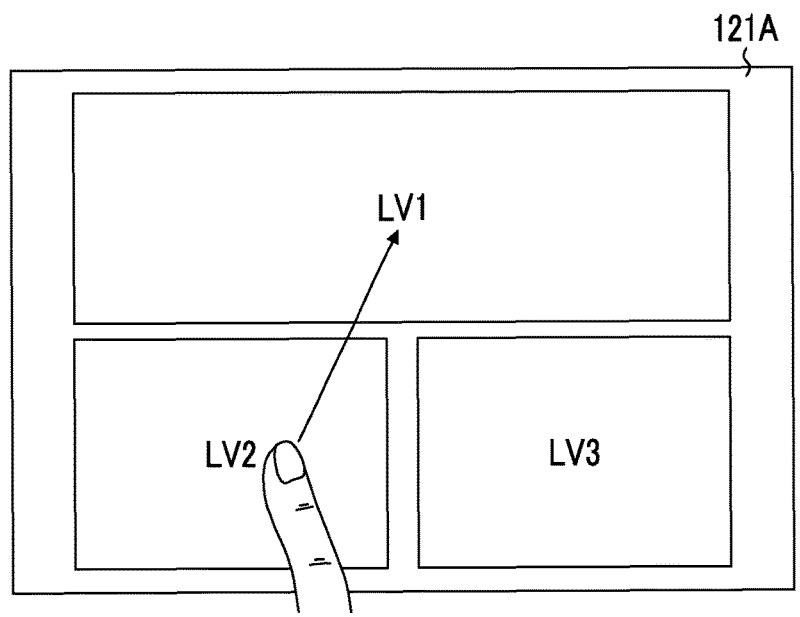
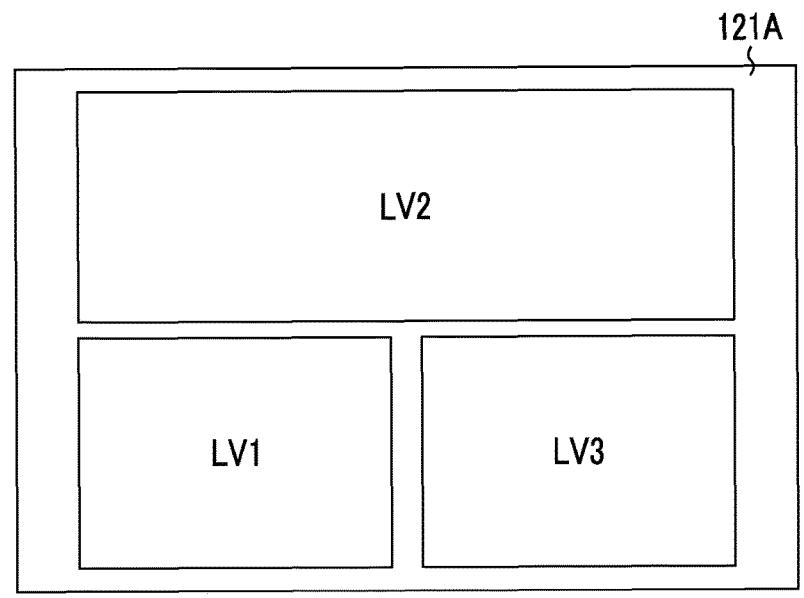

FIG. 8
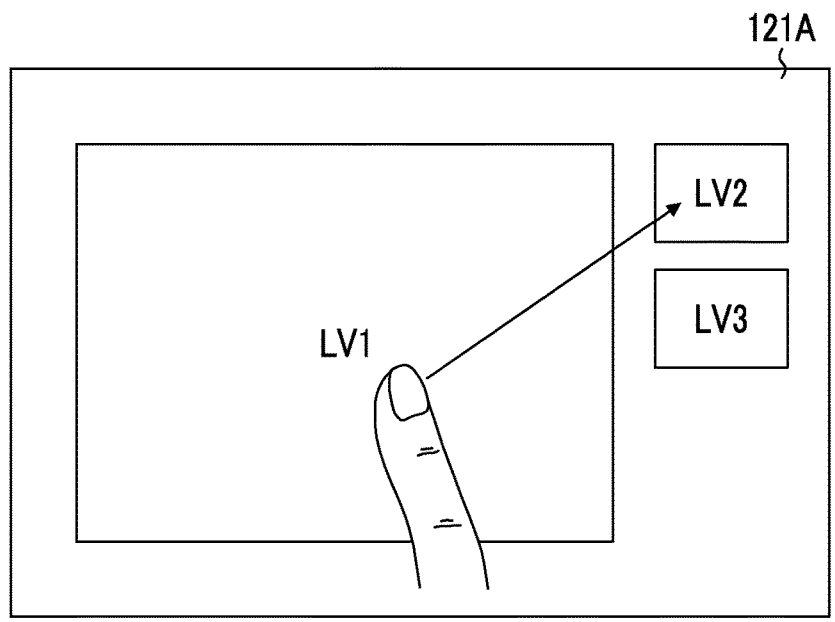
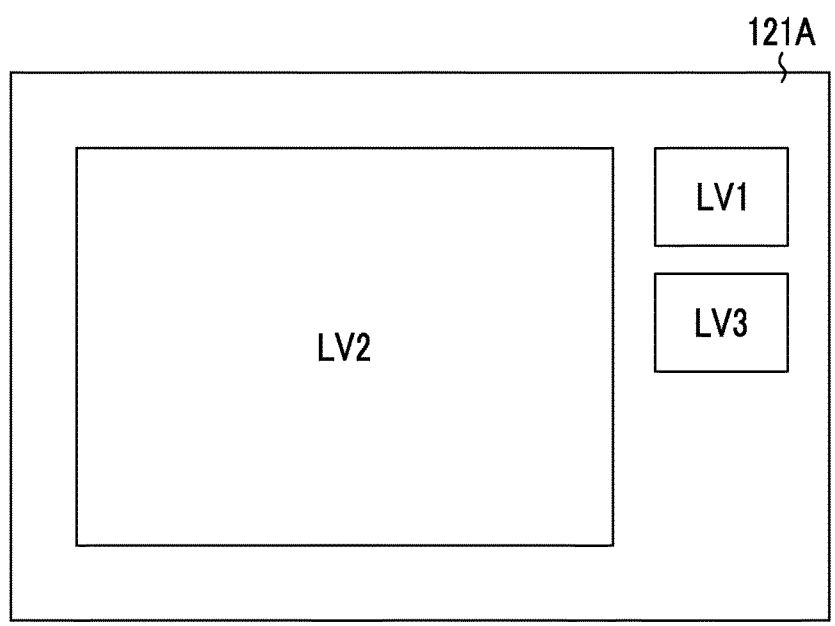

FIG. 9

<LOG FILE>

| TIME CODE | THE NUMBER OF CAMERAS | LAYOUT | FRAME POSITION |
|---|---|---|---|
| 0:00:00 | 3 | (2) | (4) |
| 0:01:00 | 3 | (3) | (1) |
| 0:05:30 | 1 | (1) | (1) |
| ⋮ | ⋮ | ⋮ | ⋮ |

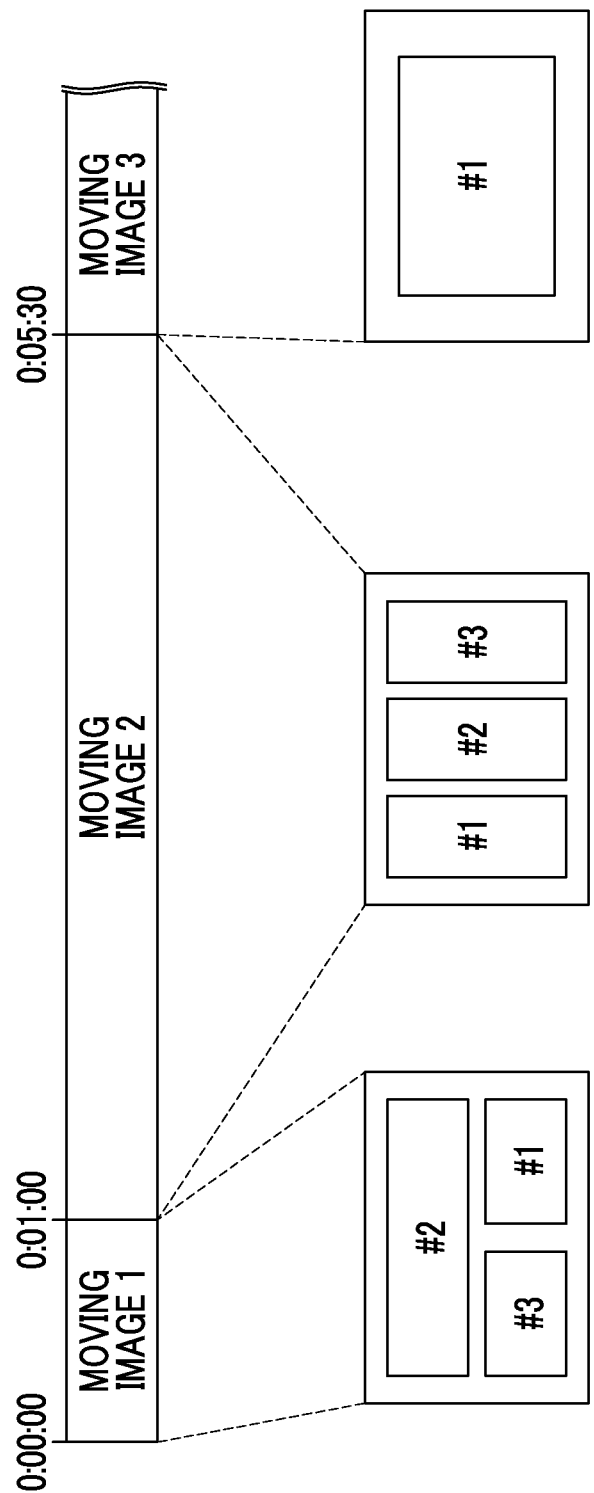

MOVING IMAGE EDITING DEVICE, MOVING IMAGE EDITING METHOD, MOVING IMAGE EDITING PROGRAM

CROSS-REFERENCE TO RELATED APPLICATIONS

This application is a Continuation of PCT International Application No. PCT/JP2015/067871 filed on Jun. 22, 2015, which claims priority under 35 U.S.C. § 119(a) to Japanese Patent Application No. 2014-181036 filed on Sep. 5, 2014. Each of the above applications is hereby expressly incorporated by reference, in their entirety, into the present application.

BACKGROUND OF THE INVENTION

1. Field of the Invention

The present invention relates to a moving image editing device, a moving image editing method, and a moving image editing program, and more particularly, to a technique that edits plural moving images which are simultaneously captured using plural cameras to create one moving image.

2. Description of the Related Art

In the related art, a moving image editing device disclosed in JP1993-183862 (JP-H5-183862) is known as a moving image editing device that is intended to enhance efficiency of an editing operation.

The moving image editing device disclosed in JP1993-183862 (JP-H5-183862) includes storage means for storing plural moving images which are sequentially input, detection means for detecting a scene-switched image using the plural moving images stored in the storage means, and moving image index information creating means for creating images detected by the detection means as moving image index information. Thus, although a user does not view all moving images, it is possible to approximately recognize details of a series of moving images using the moving index information. Further, it is possible to save efforts for retrieving a scene-switched image among moving images, and to improve efficiency of an operation such as a segmentation process, a processing conversion process, or an indexing process of moving images.

Further, JP2009-303244A discloses a technique that performs image composition called "ultra wide angle photo composition", "noise removal", and "dynamic range magnification" using plural images. The "ultra wide angle photo composition" refers to an image composition process of composing photos (images) which are dividedly captured into a single natural photo without a seam, which corresponds to a panorama image composition process, the "noise removal" refers to an image composition process of overlapping photos which are consecutively captured, having the same composition, to remove a noise, and the "dynamic range magnification" refers to an image composition process of composing two photos obtained by capturing objects having a severe lightness difference at different exposures to create a photo having a wide dynamic range without blown out highlights or crushed shadows. These processes are already known.

Furthermore, the image compositing device disclosed in JP2009-303244A extracts plural images necessary for composition based on attachment data ("camera information", "imaging date and time", "lens information", "exposure information", "lens focal distance", and the like) of image files which are composing sources, generates a composite image (a panorama image, or the like) from the extracted plural images, and adds the attachment data of the image files which are the composing sources to a file of the generated composite image (a composite image file).

JP2011-259365A discloses a camera system capable of selecting a desired video from videos from plural camera devices.

The camera system disclosed in JP2011-259365A includes plural camera devices that packetize video signals obtained through imaging for output, and a relay device that is connected to the plural camera devices and relays video signals transmitted from the plural camera devices, in which the relay device includes a receiver unit that receives respective video signals which are synchronized between the plural camera devices based on synchronization signals, and a switch unit that selects a video signal corresponding to an instruction input from the packetized video signals which are output from the plural camera devices according to an instruction from a switch and selection controller.

In addition, according to a disclosure of JP2009-303244A, video data from the plural camera devices is composed into one screen, and then, the result is output to a monitor. Thus, it is possible for a user to visually recognize videos of the plural camera devices, and to select a desired video from the videos on the monitor.

SUMMARY OF THE INVENTION

In the image editing device disclosed in JP1993-183862 (JP-H5-183862), since moving image index information is automatically created, an editor can approximately know details of a series of moving images even without viewing all the moving images, and thus, can reduce efforts for retrieving images which are scene-switched among the moving images. Thus, it is possible to improve efficiency of the editing operation, but it is difficult to achieve automation of the editing operation.

JP2009-303244A discloses a technique that extracts plural images necessary for composition of panorama images or the like based on image file attachment data and generates a composite image from the extracted plural images, but does not disclose a technique that performs editing of moving images which are simultaneously captured by plural cameras and does not even mention moving images.

An intermediate device that forms the camera system disclosed in JP2011-259365A is connected to plural cameras and relays video signals transmitted from the plural cameras. If an instruction for selecting or switching a camera video output as a video for broadcasting or the like is input from a switch and selection controller corresponding to a control panel of a video live switcher, the intermediate device selects a video signal corresponding to the instruction input from packetized video signals output from the plural cameras and outputs the selected video signal to a camera control system at a rear stage, but does not edit the plural videos captured by the plural cameras after imaging is terminated. Since the intermediate device relays video signals transmitted from plural cameras, it is necessary to acquire all the videos captured by the plural cameras in real time.

In order to solve the above problems, an object of the invention is to provide a moving image editing device, a moving image editing method, and a moving image editing program capable of automatically performing moving image editing according to an editor's intention when editing plural moving images simultaneously captured by plural cameras to create one moving image.

In order to achieve the above object, according to an aspect of the invention, there is provided a moving image editing device comprising: a live view image acquisition unit that is connected to a plurality of cameras capable of performing moving image capturing in a wireless or wired manner, and acquires one or a plurality of live view images from the plurality of cameras; a display unit that displays the one or plurality of live view images acquired by the live view image acquisition unit; an operation unit that performs switching between live view images displayed on the display unit by a manual operation; an operation history recording unit that records operation history information indicating an operation history in the operation unit; and a moving image editing unit that performs moving image editing for automatically creating, after the moving image capturing in the plurality of cameras is terminated, one moving image based on a plurality of moving images respectively captured by the plurality of cameras and the operation history information recorded in the operation history recording unit.

According to this aspect of the invention, if an operator performs an operation such as switching between live view images by manually operating the operation unit while viewing the live view images displayed on the display unit, operation history information indicating an operation history in the operation unit is recorded in the operation history recording unit. Further, if moving imaging capturing in the plurality of cameras is terminated, one moving image is automatically created based on plural moving images respectively captured by the plurality of cameras at the same time and the operation history information recorded in the operation history recording unit. Thus, when editing plural moving images simultaneously captured by the plurality of cameras to create one moving image, it is possible to automatically perform moving image editing without manually performing the editing operation again. Further, since the moving image editing is performed using operation history information at the time of moving image capturing, it is possible to perform moving image editing according to an intention of the operator (editor).

According to another aspect of the invention, it is preferable that the moving image editing device further comprises a moving image recording unit that records one moving image which is obtained through the moving imaging editing in the moving image editing unit.

According to still another aspect of the invention, in the moving image editing device, it is preferable that the moving image editing unit performs the moving image editing for automatically creating the one moving image whenever a moving image is to be reproduced, and causes the moving image obtained through the moving image editing to be displayed on the display unit. With this configuration, it is possible to check a moving image obtained through editing before being recorded in the moving image recording unit.

According to still another aspect of the invention, in the moving image editing device, the operation unit receives an operation of selecting a live view image corresponding to one moving image to be used in the moving image editing unit, among the plurality of moving images respectively captured by the plurality of cameras, the operation history information includes a time code at the time of the operation and information for specifying one moving image to be used in the moving image editing unit, and the moving image editing unit includes moving image editing for selecting any one moving image among the plurality of moving images respectively captured by the plurality of cameras based on the operation history information and connecting the selected moving image.

According to this aspect of the invention, if an operator performs switching between live view images by manually operating the operation unit, it is possible to select a moving image corresponding to each switched live view image, and to connect the selected moving images in a time-series order to generate one moving image.

According to still another aspect of the invention, in the moving image editing device, the operation unit receives an operation of specifying two or more moving images to be simultaneously displayed among the plurality of moving images respectively captured by the plurality of cameras and specifying a layout that represents frame shapes and frame positions of respective frames of the specified two or more moving images, the display unit displays live view images corresponding to the two or more moving images specified by the operation unit in the specified layout, the operation history information includes information indicating the two or more moving images specified by the operation unit and layout information indicating the specified layout, and the moving image editing unit includes moving image editing for specifying two or more moving images to be simultaneously displayed among the plurality of moving images respectively captured by the plurality of cameras based on the operation history information and composing the specified two or more moving images according to the specified layout.

According to this aspect of the invention, if an operator performs an operation of specifying a layout that represents frame shapes and frame positions of respective frames of two or more moving images by manually operating the operation unit, live view images (multi live view image) corresponding to the layout that represents the frame shapes and the frame positions of the respective frames of two or more moving images are displayed on the display unit. Thus, it is possible to select two or more moving images corresponding to the multi live view image, and to perform moving image editing for composing the selected two or more moving images according to the specified layout.

According to still another aspect of the invention, it is preferable that the moving image editing device further comprises a moving image acquisition unit that acquires all of the plurality of moving images from the plurality of cameras or acquires only moving images to be used for the moving image editing among the plurality of moving images from the plurality of cameras based on the operation history information, after the moving image capturing in the plurality of cameras is terminated. The former case is suitable, since all moving images of an editing source are acquired, for a case where all the moving images of the editing source are stored in the moving image editing device, and the latter case has an advantage, since only moving images used for moving image editing are acquired, in that unnecessary communication or the like does not occur.

According to still another aspect of the invention, in the moving image editing device, it is preferable that the display unit and the operation unit are configured by a touch panel that includes a display panel and an operation panel that detects coordinates touched on the display panel, and the display panel includes a region where the live view image is displayed and a region where an operation icon button is displayed.

According to still another aspect of the invention, in the moving image editing device, it is preferable that the display unit and the operation unit are configured by a touch panel that includes a display panel and an operation panel that detects coordinates touched on the display panel, and the display panel includes a region where the live view image is displayed, and a region where an operation icon button is displayed, and the operation icon button includes a layout button for selecting the layout.

According to still another aspect of the invention, in the moving image editing device, it is preferable that the display unit and the operation unit are configured by a touch panel that includes a display panel and an operation panel that detects coordinates touched on the display panel, and the display panel includes a region where the live view image is displayed, and the operation unit gives an instruction for performing switching between frame positions in a layout of the specified two or more moving images based on a swipe operation between respective frame regions in which the live view images are displayed.

According to still another aspect of the invention, in the moving image editing device, it is preferable that the plurality of cameras includes a pan/tilt camera, and the moving image editing device further comprises a pan/tile operation unit that operates the pan/tilt camera by remote control, and a driving command output unit that outputs a driving command to the pan/tilt camera according to an operation in the pan/tilt operation unit.

According to still another aspect of the invention, there is provided a moving image editing method comprising: a step of acquiring one or a plurality of live view images from a plurality of cameras capable of performing moving image capturing in a wired or wireless manner; a step of displaying the acquired one or plurality of live view images on a display unit; a step of performing switching between live view images which are being displayed on the display unit by a manual operation in an operation unit; a step of recording operation history information indicating an operation history in the operation unit while the moving image capturing is being performed in the plurality of cameras in an operation history recording unit; and a step of performing moving image editing for automatically creating, after the moving image capturing in the plurality of cameras is terminated, one moving image based on a plurality of moving images respectively captured by the plurality of cameras and the operation history information recorded in the operation history recording unit.

According to still another aspect of the invention, the moving image editing method further comprise a step of recording one moving image which is obtained through the moving imaging editing in a moving image recording unit.

According to still another aspect of the invention, in moving image editing method, it is preferable that the step of performing the moving image editing includes performing the moving image editing for automatically creating the one moving image whenever a moving image is to be reproduced and causing the moving image obtained through the moving image editing to be displayed on the display unit.

According to still another aspect of the invention, in moving image editing method, the manual operation in the operation unit includes an operation of selecting a live view image corresponding to one moving image to be used for the moving image editing, among the plurality of moving images respectively captured by the plurality of cameras, the operation history information includes a time code at the time of the operation and information for specifying one moving image to be used in the moving image editing unit, and the step of performing the moving image editing includes moving image editing for selecting any one moving image among the plurality of moving images respectively captured by the plurality of cameras based on the operation history information and connecting the selected moving image.

According to still another aspect of the invention, in moving image editing method, the manual operation in the operation unit includes an operation of specifying two or more moving images to be simultaneously displayed among the plurality of moving images respectively captured by the plurality of cameras and specifying a layout that represents frame shapes and frame positions of respective frames of the specified two or more moving images, the step of displaying the live view images on the display unit includes displaying live view images corresponding to the two or more moving images specified by the operation unit in the specified layout, the operation history information includes information indicating the two or more moving images specified by the operation unit and layout information indicating the specified layout, and the step of performing the moving image editing includes moving image editing for specifying two or more moving images to be simultaneously displayed among the plurality of moving images respectively captured by the plurality of cameras based on the operation history information and composing the specified two or more moving images according to the specified layout.

According to still another aspect of the invention, there is provided a moving image editing program that causes a portable terminal that includes a wireless communication unit, a display unit, an operation unit, a computer to function as a moving image editing device of a plurality of moving images captured by a plurality of cameras capable of performing moving image capturing, the program causing the computer to realize: a function of acquiring one or a plurality of live view images from the plurality of cameras in a wired or wireless manner; a function of displaying the acquired one or plurality of live view images on a display unit; a function of performing switching between live view images displayed on the display unit by a manual operation in an operation unit; a function of recording operation history information indicating an operation history in the operation unit; and a function of performing moving image editing for automatically creating, after the moving image capturing in the plurality of cameras is terminated, one moving image based on a plurality of moving images respectively captured by the plurality of cameras and the operation history information recorded in the operation history recording unit. A computer readable non-transitory recording medium on which the program is recorded is also included in this aspect of the invention.

According to the invention, if an editor performs an operation such as switching between live view images by manually operating the operation unit while viewing the live view images during moving image capturing in the plurality of cameras, operation history information indicating an operation history in the operation unit is recorded, and after the moving imaging capturing is terminated, one moving image is automatically created based on plural moving images simultaneously captured by the plurality of cameras and the recorded operation history information. Thus, when performing moving image editing, it is possible to automatically perform moving image editing without manually performing the editing operation again. Further, since the moving image editing is performed using operation history information at the time of moving image capturing, it is possible to perform moving image editing according to an intention of the editor.

BRIEF DESCRIPTION OF THE DRAWINGS

FIG. 6 is a diagram showing combinations of frame positions obtained in a case where frame positions of frames of three live view images in a predetermined layout in which three live view images are displayed as a multi live view are switched.

FIGS. 7(a) and 7(b) are enlarged views illustrating a display region in which a multi live view on the display panel shown in FIG. 4 is displayed, which particularly shows switching between frame positions of live view images.

FIGS. 8(a) and 8(b) are enlarged views illustrating a display region in which a multi live view displayed on the display panel shown in FIG. 4 is displayed, which particularly shows switching between one live view image in a case where one live view image is displayed.

FIG. 9 is a diagram showing an example of a log file recorded in a recording unit.

FIG. 12 is a diagram showing a relationship between edited moving images and respective frames in the moving images.

DESCRIPTION OF THE PREFERRED EMBODIMENTS

Hereinafter, a moving image editing device, a moving image editing method, and a moving image editing program according to the invention will be described with reference to the accompanying drawings.

<System Including Moving Image Editing Device>

Figure 1:
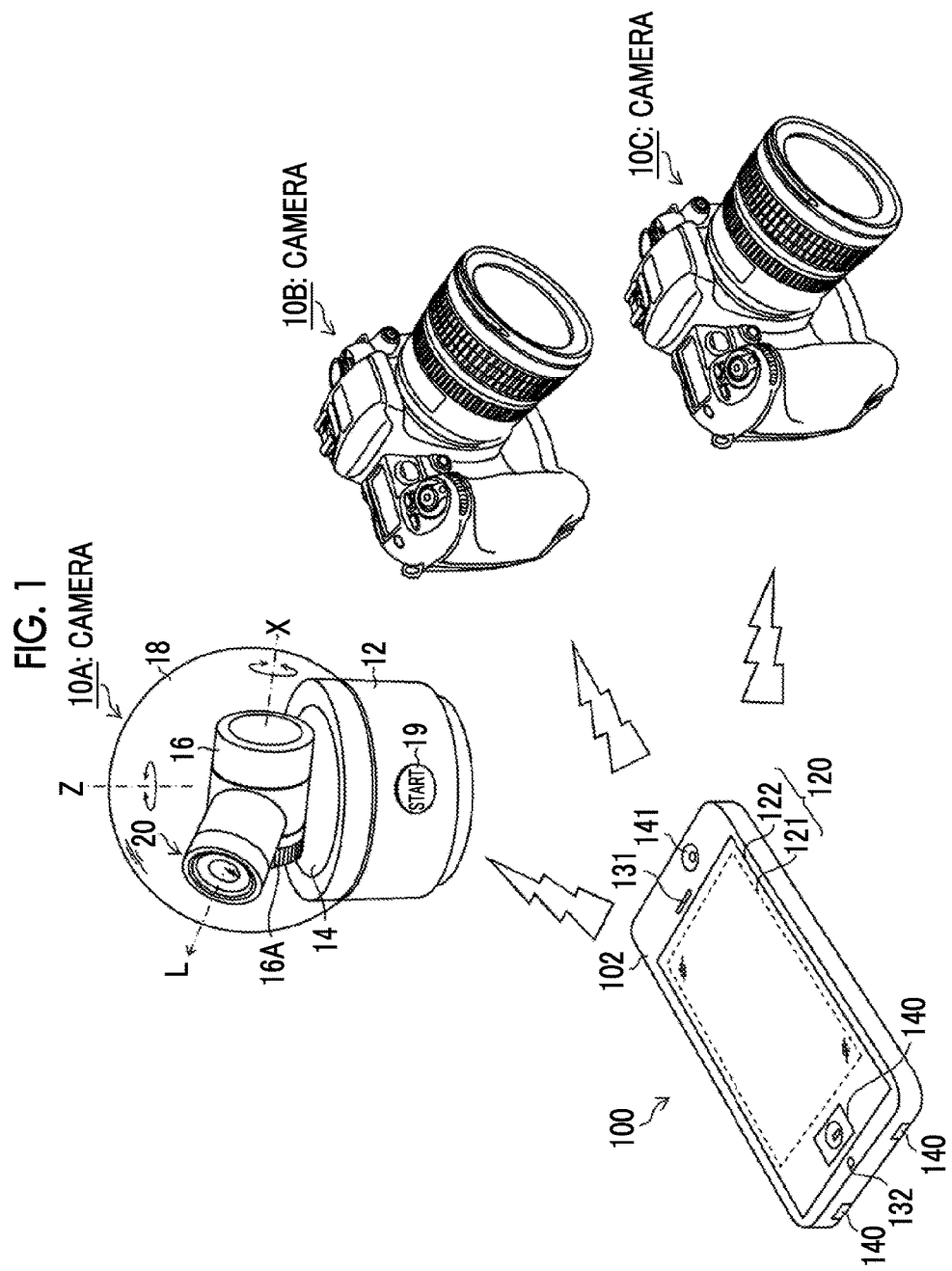
FIG. 1 is a perspective view showing an appearance of a system including a moving image editing device according to the invention.

FIG. 1 is a perspective view showing an appearance of a system including a moving image editing device according to the invention.

The system shown in FIG. 1 includes plural (in this example, three) cameras 10A, 10B, and 10C capable of capturing moving images, and a moving image editing device (in this example, smartphone) 100 according to the invention.

The camera 10A is a pan/tilt camera, and each of the cameras 10B and 10C is a normal camera that does not have a pan/tilt component. The plural cameras are not limited to the above types of cameras, and may include a digital video camera, or may include the same type of cameras. In brief, any camera capable of capturing at least moving images may be used.

The camera 10A shown in FIG. 1 includes, as main components, a camera body 12, a stand 14, and a holding portion 16 that is fixedly mounted on the stand 14 and holds an imaging unit 20 to be rotatable, and a dome cover 18 that covers the imaging unit 20.

Figure 2:
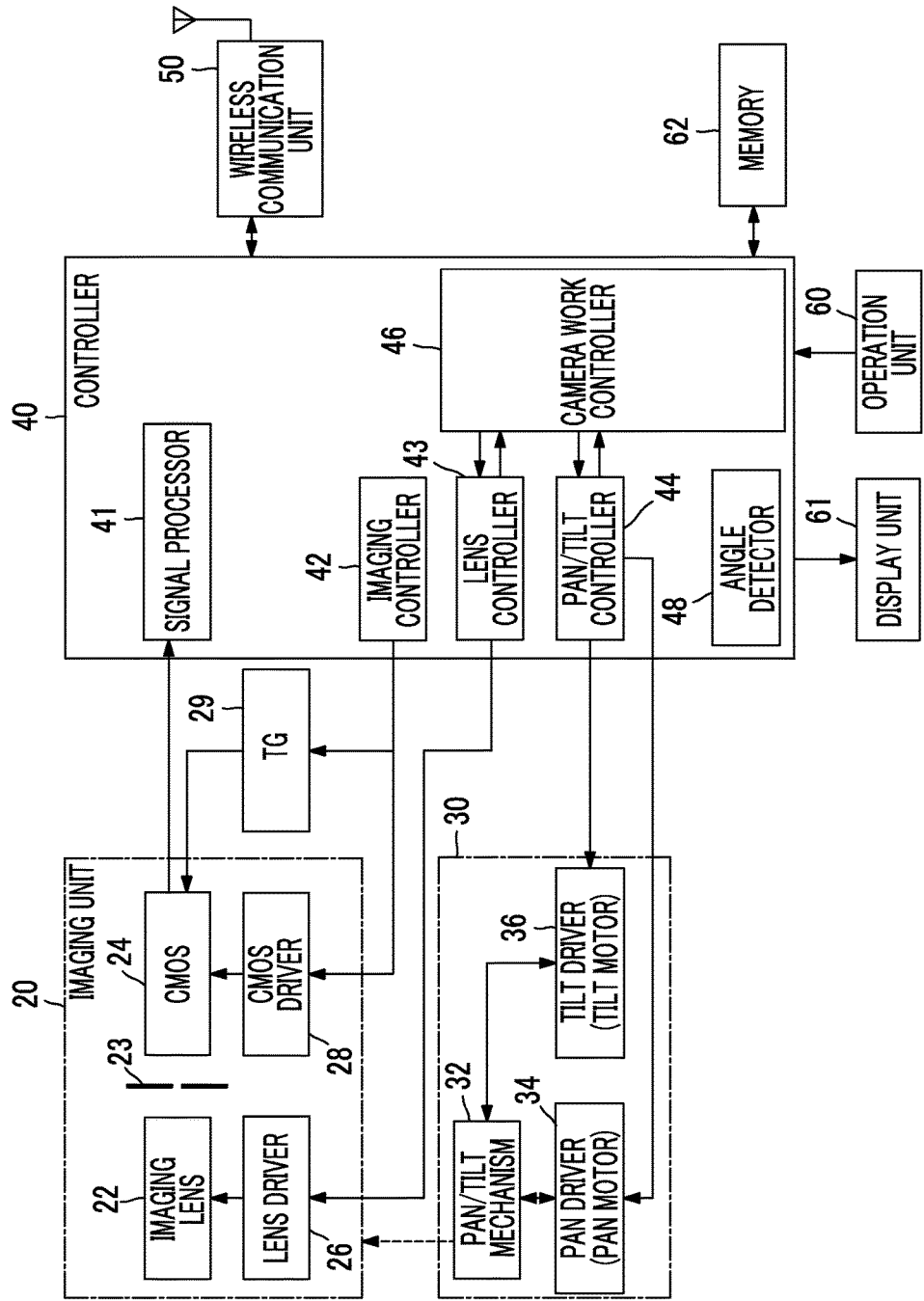
FIG. 2 is a block diagram illustrating an embodiment of an internal configuration of a camera 10A shown in FIG. 1.

The stand 14 is disposed to be rotatable around a vertical axis Z of the camera body 12, and is rotated around the vertical axis Z using a pan driver 34 (FIG. 2).

The holding portion 16 includes a gear 16A provided on the same axis as a horizontal axis X, and rotates (tilt operation) upward and downward the imaging unit 20 as a driving force is transmitted from a tilt driver 36 (FIG. 2) through the gear 16A.

It is preferable that the dome cover 18 is a cover for dust-proof and drip-proof and has a spherical shell shape having a predetermined thickness, in which an intersection between the horizontal axis X and the vertical axis Z is a curvature center, so that an optical performance of the imaging unit 20 does not change regardless of an optical axis direction L of the imaging unit 20.

Further, it is preferable that a tripod mounting portion (tripod screw holes, or the like) (not shown) is provided on a rear surface of the camera body 12.

An imaging start button 19 that gives an instruction for starting imaging, a power source switch (not shown), a wireless communication unit 50 (see FIG. 2), and the like are provided in the camera 10A. The camera 10A performs wireless communication with the smartphone 100 through the wireless communication unit 50, receives instruction signals for various operations from the smartphone 100, and transmits image data indicating captured live view images, or the like to the smartphone 100.

The cameras 10B and 10C do not have a pan/tilt component, but are the same as the camera 10A in that a wireless communication unit that performs wireless communication with the smartphone 100 is provided.

The cameras 10A to 10C have a function for recording time codes (SMPTE time codes) of a standard specification determined by Society of Motion Picture and Television Engineers (SMPTE) in association with respective frames of moving images in moving image capturing. Here, the SMPTE time codes are used for synchronization, editing, or the like of moving images and indicate imaging time points of respective frames of the moving images. Further, the SMPTE time codes of the smartphone 100 and the SMPTE time codes of the cameras 10A to 10C may be synchronized, and the smartphone 100 may match SMPTE frame rates of moving images to be captured by the cameras 10A to 10C, and may set SMPTE start frames thereof as "0:00:00:00".

<Camera 10A (Pan/Tilt Camera)>

FIG. 2 is a block diagram illustrating an embodiment of an internal configuration of the camera 10A.

The camera 10A may capture a still image and a moving image, but hereinafter, a case where the camera 10A captures a moving image will be described.

The camera 10A comprises the imaging unit 20, a pan/tilt device 30, a controller 40, and the wireless communication unit 50.

The imaging unit 20 includes an imaging lens 22, an imaging element 24, and the like. The imaging lens 22 is configured by a single focus lens or a zoom lens, and forms a subject image on an imaging surface of the imaging element 24. A focus lens included in the imaging lens 22, a variable magnification lens (in the case of a zoom lens), and a diaphragm 23 are respectively driven by a lens driver 26.

The imaging element 24 of this example is a color imaging element in which primary color filters of three primary colors of red (R), green (G), and blue (B) are disposed (Bayer array, G-striped R/G full checker, X-Trans (registered trademark) array, or honeycomb array) in a predetermined pattern for each pixel, and is configured by a complementary metal oxide semiconductor (CMOS) image sensor. The imaging element 24 is not limited to the CMOS image sensor, and may be a charge coupled device (CCD) image sensor.

The imaging element 24 is driven by a CMOS driver 28 that includes a vertical driver, a horizontal driver, and the like, and a timing generator (TG) 29, and a pixel signal (a digital signal corresponding to signal charges accumulated for each pixel) is read from the imaging element 24.

The pan/tilt device 30 comprises a pan mechanism that rotates the imaging unit 20 in a horizontal direction (pan direction) with respect to the camera body 12 as shown in FIG. 1 and a tilt mechanism that rotates the imaging unit 20 in a vertical direction (tilt direction) with respect to the camera body 12 as shown in FIG. 1 (hereinafter, the pan mechanism and the tilt mechanism are collectively referred to as a "pan/tilt mechanism" 32), the pan driver 34, and the tilt driver 36, and the like. The pan/tilt mechanism 32 includes a home position sensor (for example, a proximity switch) that detects a reference position in the pan direction, and a home position sensor that detects a reference position in the tilt direction.

The pan driver 34 and the tilt driver 36 include a pan motor and a tilt motor which are configured by a stepping motor, respectively, and a motor driver that drives each motor, and output a driving force to the pan/tilt mechanism 32 to drive the pan/tilt mechanism 32.

The controller 40 comprises a signal processor 41, an imaging controller 42, a lens controller 43, a pan/tilt controller 44, and a camera work controller 46.

The signal processor 41 performs signal processing such as offset processing, gain control processing including white balance correction and sensitivity correction, gamma correction processing, demosaic processing (demosaicing), or RGB/YC conversion processing, with respect to a digital image signal input from the imaging unit 20. Here, the demosaic processing is a process of calculating all of color information for each pixel from a mosaic image corresponding to a color filter array of a single plate-type color imaging element, which is also referred to as a synchronization process. For example, in the case of an imaging element that includes color filters of three colors of R, G, and B, the demosaic processing is a process of calculating color information about all colors of R, G, and B for each pixel from a mosaic image formed by R, G, and B. Further, the RGB/YC conversion processing is a process of generating luminance data Y and color difference data Cb and Cr from RGB image data which is demosaic-processed.

The imaging controller 42 is a unit that gives a command for discharging charges accumulated in a capacitor for each pixel of the imaging element 24, reading of a signal corresponding to the charges accumulated in the capacitor, or the like through the CMOS driver 28 and the timing generator (TG) 29, and performs an imaging control of moving images.

The lens controller 43 is a unit that controls a focus lens included in the imaging lens 22, the variable magnification lens, and the diaphragm 23 through the lens driver 26, and performs an auto focus (AF) control for moving the focus lens to a focusing position, or the like. The AF control is performed by integrating absolute values of high frequency components of digital signals corresponding to an AF area, detecting a focusing position where the integrated value (AF evaluation value) becomes a maximum, and moving the focus lens to the detected focusing position.

The pan/tilt controller 44 is a unit that controls the pan/tilt device 30, and outputs a motor driving command input through the wireless communication unit 50 and the camera work controller 46 (motor driving command input unit) from the smartphone 100 to the pan driver 34 and the tilt driver 36 of the pan/tilt mechanism 32.

The camera work controller 46 outputs command signals for controlling the lens controller 43 and the pan/tilt controller 44 in order to realize imaging of a desired moving image.

An angle detector 48 is a unit that detects a pan angle and a tilt angle of the pan/tilt mechanism 32, respectively, and includes a first counter that counts up or counts down (performs counting of) the number of pulse signals for driving the pan motor of the pan driver 34, and a second counter that counts up or counts down the number of pulse signals for driving the tilt motor of the tilt driver 36. Counted values of the first counter and the second counter are reset to zero by detection signals of the home position sensor that detects the reference position in the pan direction and of the home position sensor that detects the reference position in the tilt direction provided in the pan/tilt mechanism 32, or instead, regulated values may be preset. Accordingly, after the counted values are reset or preset, the counted value of the first counter and the counted value of the second counter correspond to a pan angle (pan position) and a tilt angle (tilt position) of the pan/tilt mechanism 32, respectively.

The wireless communication unit 50 (information output unit and live view image output unit) is a unit that performs wireless communication with the smartphone 100 shown in FIG. 1, or the like, and forms a wireless local area network (LAN) with an access point (for example, the smartphone 100 or a router), receives various operation instruction inputs from the smartphone 100, and transmits angle information indicating the pan angle and the tilt angle detected by the angle detector 48 to the smartphone 100. Further, the wireless communication unit 50 may transmit images (live view images) which are captured as moving images by the imaging unit 20 and are processed by the signal processor 41 to the smartphone 100, and may transmit moving images for recording which are captured as moving images by the imaging unit 20 to the smartphone 100. Thus, the wireless communication unit 50 may record the moving images for recording on an internal or external recording medium (recording unit) of the smartphone 100, or may display the live view images in a live view image display region of a display panel 121 of the smartphone 100.

The operation unit 60 includes the imaging start button 19 (FIG. 1) provided in the camera body 12, a power source switch, and the like, and may perform operation instruction inputs which are the same as operation instruction inputs from the smartphone 100.

The display unit 61 functions as a display unit that displays live view images, reproduction images, or the like, and functions as a user interface unit (UI unit) for displaying a menu screen and for setting and inputting various parameters in cooperation with the operation unit 60.

The memory 62 includes a recording unit such as a synchronous dynamic random access memory (SDRAM) which serves as a storage region that temporarily stores captured images and a work area for performing various computational operations or the like, a read only memory (ROM) in which a program for imaging, a variety of data necessary for control, or the like is stored, or a flash ROM on which captured moving images are recorded.

<Moving Image Editing Device>

Next, an embodiment of a pan/tilt operation device according to the invention will be described.

In the example shown in FIG. 1, the smartphone 100 in which a moving image editing program (which will be described later) is installed in a general-purpose smartphone functions as the moving image editing device according to the invention.

Figure 3:
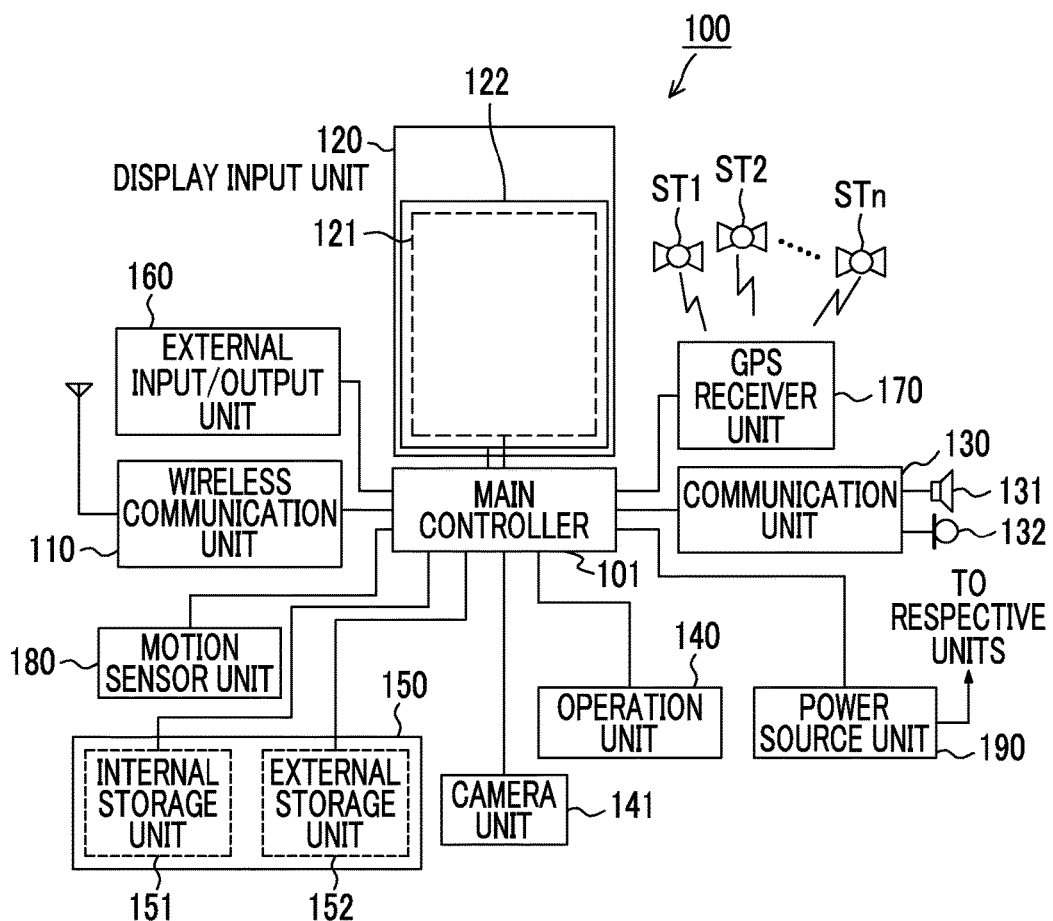
FIG. 3 is a block diagram illustrating a configuration of a smartphone shown in FIG. 1.

FIG. 3 is a block diagram showing a configuration of the smartphone 100 shown in FIG. 1.

As shown in FIG. 3, the smartphone 100 comprises, as main components, a wireless communication unit 110, a display input unit (touch panel) 120, a call unit 130, an operation unit 140, a camera unit 141, and a storage unit (moving image recording unit) 150, an external input/output unit 160, a global positioning system (GPS) receiver unit 170, a motion sensor unit 180, a power source unit 190, and a main controller 101. Further, the smartphone 100 has a wireless communication function for performing mobile wireless communication with a base station device BS through a mobile communication network NW as a main function.

The wireless communication unit 110 performs wireless communication with the base station device BS included in the mobile communication network NW according to an instruction of the main controller 101. Using the wireless communication, the wireless communication unit 110 performs transmission and reception of a variety of file data such as voice data or image data, e-mail data, or the like, and performs reception of Web data, streaming data, or the like. In this example, the wireless communication unit 110 of the smartphone 100 forms a wireless LAN with stations (for example, cameras 10A to 10C) and an access point (for example, a router), and transmits various operation instruction inputs to the cameras 10A to 10C or receives live view images and moving images for recording, or the like from the cameras 10A to 10C.

The touch panel 120 displays live view images, character information, or the like under the control of the main controller 101 to visually transmit the information to a user, and detects a user operation with respect to the displayed information. The touch panel 120 comprises a display panel 121 (display unit) and an operation panel 122 (operation unit). When viewing 3D images, it is preferable that the display panel 121 is a 3D display panel.

The display panel 121 uses a liquid crystal display (LCD), an organic electro-luminescence display (OELD), or the like as a display device.

The operation panel 122 is a device that is provided so that an image displayed on a display surface of the display panel 121 can be visually recognized and detects one or plural sets of coordinates operated by a user's finger or a stylus. If the device is operated by a user's finger or a stylus, the operation panel 122 outputs a detection signal generated due to the operation to the main controller 101. Then, the main controller 101 detects an operation position (coordinates) on the display panel 121 based on the received detection signal.

As shown in FIG. 1, a configuration in which the display panel 121 and the operation panel 122 of the smartphone 100 are integrated to form the touch panel 120 is used, in which the operation panel 122 is disposed to completely cover the display panel 121. In a case where such a configuration is employed, the operation panel 122 may have a function for detecting a user operation in a region out of the display panel 121. In other words, the operation panel 122 may include a detection region with respect to a portion that overlaps the display panel 121 (hereinafter, referred to as a "display region"), and a detection region with respect to an outer edge portion that does not overlap the display panel 121 (hereinafter, referred to as a "non-display region").

The size of the display region and the size of the display panel 121 may be completely the same, but it is not essential that both of the sizes are the same. Further, the operation panel 122 may include two sensitive regions of an outer edge portion and an inner portion other than the outer edge portion. Further, the width of the outer edge portion is appropriately designed according to the size of the housing 102, or the like. Furthermore, as a position detection method employed in the operation panel 122, any one of a matrix switch type, a resistive film type, a surface acoustic wave type, an infrared type, an electromagnetic induction type, an electrostatic capacitance type, and the like may be employed.

The call unit 130 includes a speaker 131 and a microphone 132. The call unit 130 converts user's voice input through the microphone 132 into voice data capable of being processed by the main controller 101 and outputs the result to the main controller 101, or decodes voice data received by the wireless communication unit 110 or the external input/output unit 160 and outputs the result through the speaker 131. Further, as shown in FIG. 1, for example, the speaker 131 and the microphone 132 may be mounted on the same surface as the surface where the display input unit 120 is provided.

The operation unit 140 is a hardware key using a key switch or the like, and receives an instruction from a user. For example, the operation unit 140 is a push button switch that is mounted on a lower side of the housing 102 of the smartphone 100, or on a side surface of the housing 102, is turned on when being pressed by a finger or the like, and is turned off by a restoring force of a spring or the like when the finger is separated.

The storage unit 150 stores a control program or control data of the main controller 101, address data in which a name, a telephone number, and the like of a communication partner are associated with each other, data on transmitted or received e-mails, Web data downloaded by a Web browser, or data on downloaded content, and temporarily stores streaming data or the like. Further, the storage unit 150 includes an internal storage section 151 provided in the smartphone, and an external storage section 152 provided with a detachable slot for external memory. Each of the internal storage section 151 and the external storage section 152 that form the storage unit 150 is realized using a storage medium such as a flash memory, a hard disk, a multimedia card micro type memory, a card type memory (for example, MicroSD (registered trademark) memory or the like), a random access memory (RAM), a read only memory (ROM), or the like.

The external input/output unit 160 serves as an interface with respect to all types of external devices to be connected to the smartphone 100, and is directly or indirectly connected to other external devices through communication or the like (for example, Universal Serial Bus (USB), IEEE1394, or the like) or a network (for example, Internet, wireless LAN, Bluetooth (registered trademark), Radio Frequency Identification (RFID), Infrared Data Association (IrDA, registered trademark), Ultra Wideband (UWB, registered trademark), ZigBee (registered trademark), or the like).

As an external device to be connected to the smartphone 100, for example, a wired or wireless headset, a wired or wireless external charger, a wired or wireless data port, a memory card, a Subscriber Identity Module (SIM) card or a User Identity Module (UIM) card connected through a card socket, an external audio/video device connected through an audio/video input/output (I/O) terminal, an external audio/video device connected in a wireless manner, a smartphone connected in a wired or wireless manner, a personal computer connected in a wired or wireless manner, a PDA connected in a wired or wireless manner, an earphone connected in a wired or wireless manner, or the like may be used. The external input/output unit may be configured to transmit received data transmitted from the external device to respective components in the smartphone 100, or to transmit data in the smartphone 100 to the external device.

The GPS receiver unit 170 receives GPS signals transmitted from GPS satellites STI to STn according to an instruction of the main controller 101, executes a positioning operation process based on the plural received GPS signals, and detects a position specified by the latitude, longitude and altitude of the smartphone 100. In a case where position information can be acquired from the wireless communication unit 110 and/or the external input/output unit 160 (for example, wireless LAN), the GPS receiver unit 170 can also detect the position using the position information.

The motion sensor unit 180 includes a triaxial acceleration sensor or the like, for example, and detects a physical movement of the smartphone 100 according to an instruction of the main controller 101. By detecting the physical movement of the smartphone 100, a direction and an acceleration where the smartphone 100 moves are detected. The detection result is output to the main controller 101.

The power source unit 190 supplies power accumulated in a battery (not shown) to respective units of the smartphone 100 according to an instruction of the main controller 101.

The main controller 101 comprises a microprocessor, and is operated according to a control program or control data stored in the storage unit 150 to generally control the respective units of the smartphone 100. Further, the main controller 101 has a mobile communication control function for controlling respective units of a communication system and an application processing function in order to perform voice communication or data communication through the wireless communication unit 110.

The application processing function is realized as the main controller 101 is operated according to application software stored in the storage unit 150. As the application processing function, for example, an infrared communication function for controlling the external input/output unit 160 to perform data communication with an opposing device, an e-mail function for performing transmission and reception of e-mails, a Web browsing function for browsing Web pages, or the like, is used.

Further, the main controller 101 has an image processing function, for example, for displaying video on the touch panel 120 based on image data (data on moving images) such as received data or downloaded streaming data. The image processing function refers to a function for decoding the image data, performing image processing with respect to the decoded image data, and displaying an image obtained through the image processing on the touch panel 120, by the main controller 101.

In addition, the main controller 101 executes a display control with respect to the display panel 121, and an operation detection control for detecting a user operation through the operation unit 140 or the operation panel 122.

By execution of the display control, the main controller 101 displays an icon for starting up application software or a software key such as a scroll bar, or displays a window for creating an e-mail. The scroll bar refers to a software key for receiving, with respect to a large image which is not accommodated in a display region of the display panel 121, an instruction for moving a display portion of the image.

Further, by execution of the operation detection control, the main controller 101 detects a user operation through the operation unit 140, receives an operation with respect to the icon or an input of a character string with respect to an input section of the window, through the operation panel 122, or receives a scroll request of a display image through the scroll bar.

Furthermore, by execution of the operation detection control, the main controller 101 has a touch panel control function for determining whether an operation position with respect to the operation panel 122 corresponds to a portion (display region) that overlaps the display panel 121 or an outer edge portion (non-display region) that does not overlap the display panel 121, and for controlling a sensitive region of the operation panel 122 and a display position of a software key.

The main controller 101 may detect a gesture operation with respect to the operation panel 122, and may execute a predetermined function according to the detected gesture operation. The gesture operation does not refer to a typical simple operation, but refers to an operation of drawing a locus using a finger or the like, an operation of simultaneously designating plural positions, or an operation of drawing a locus with respect to at least one of plural positions by combination of the above operations.

The camera unit 141 is a digital camera that performs electronic imaging using an imaging element such as a complementary metal oxide semiconductor (CMOS) or a charge-coupled device (CCD).

The camera unit 141 may convert image data obtained through imaging into compressed image data such as Joint Photographic coding Experts Group (JPEG), for example, may record the image data in the storage unit 150, or may output the image data through the external input/output unit 160 or the wireless communication unit 110, under the control of the main controller 101.

In the smartphone 100 shown in FIG. 1, the camera unit 141 is mounted on the same surface as that of the touch panel 120, but the mounting position of the camera unit 141 is not limited thereto, and may be mounted on a rear surface of the touch panel 120, or plural camera units 141 may be mounted thereon. In a case where the plural camera units 141 are mounted, imaging may be performed using a single camera unit 141 while performing switching between the plural camera units 141 to be provided for imaging, or may be performed using the plural camera units 141 at the same time.

Further, the camera unit 141 may be used for various functions of the smartphone 100. For example, an image acquired by the camera unit 141 may be displayed on the display panel 121, or an image in the camera unit 141 may be used as one of operation inputs through the operation panel 122. Further, when detecting a position using the GPS receiver unit 170, the position may be detected with reference to an image from the camera unit 141. In addition, it is possible to determine an optical axis direction or a current usage environment of the camera unit 141 of the smartphone 100 without using a triaxial acceleration sensor or by using the triaxial acceleration sensor together, with reference to an image from the camera unit 141. Furthermore, an image from the camera unit 141 may be used in the application software (the moving image editing program according to the invention).

In this example, the application software for operating the cameras 10A to 10C is downloaded through the network and is stored in the storage unit 150, and the main controller 101 is operated according to the downloaded application software using the application processing function of the smartphone 100. Thus, the general-purpose smartphone 100 functions as a moving image editing device for automatically editing plural moving images captured by the plural cameras 10A to 10C.

<Display Screen of Smartphone>

Figure 4:
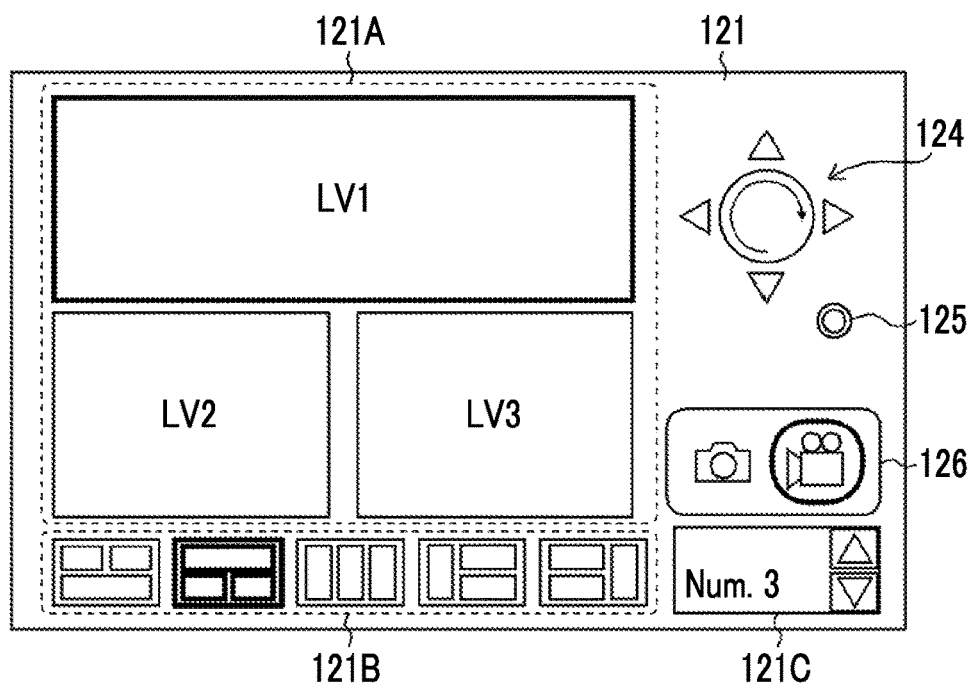
FIG. 4 is a diagram illustrating an embodiment of a display screen of the smartphone.

FIG. 4 is a diagram illustrating an embodiment of a display screen of the smartphone 100.

The smartphone 100 includes the touch panel 120 provided with the display panel 121 and the operation panel 122 (see FIG. 3), in which a panel surface of the display panel 121 serves as a display screen.

As shown in FIG. 4, a display region 121A where live view images are displayed, a display region 121B where icon buttons (layout buttons) indicating layouts of frames of moving images are displayed, and a display region 121C where a dialogue box including an up/down control for setting the number of one or plural cameras used for moving image editing is displayed are provided in the display panel 121. Further, a multi-functional cross key 124 that includes icons indicating upper, lower, left and right directional keys and a center key, an imaging start button (icon button) 125 for instructing the start of imaging, and a select button (icon button) 126 for selecting imaging of a still image or a moving image are displayed in the display panel 121.

The main controller 101 (display controller) causes live view images received through the wireless communication unit 110 (live view image acquisition unit) from the cameras 10A to 10C to be displayed in the display region 121A of the display panel 121.

Here, the main controller 101 causes a live view image to be displayed in the display region 121A of the display panel 121 according to a layout selected by any one of icon buttons indicating layouts, displayed in the display region 121B. In the example shown in FIG. 4, since the second icon button (an icon button indicated by a thick frame) from the left among icon buttons indicating five layouts is operated and a layout indicated by the second icon button from the left among icon buttons is selected, the main controller 101 causes three live view images to be displayed in the display region 121A of the display panel 121 according to the layout indicated by the second icon button from the left.

By increasing or decreasing a numeral in the dialogue box displayed in the display region 121C of the display panel 121 through the up/down control, it is possible to select the number of cameras used for moving image editing. Further, icon buttons indicating layouts displayed in the display region 121B also change according to the number of selected cameras. Details about the number of cameras and layouts of frames corresponding to the number of cameras will be described later.

If any one live view image among live view images displayed in the display region 121A of the display panel 121 is touch-operated, a frame of the touch-operated live view image is highlighted (displayed by a thick frame), to thereby make it possible to individually operate, by remote control, a camera that transmits the live view image displayed by the thick frame.

In the example shown in FIG. 4, in a case where a frame of a live view image LV1 is displayed by a thick line and a camera that transmits the live view image LV1 is the camera 10A (pan/tilt camera), if any one directional key of the cross key 124 that functions as a pan/tilt operation unit is touch-operated, the main controller 101 (driving instruction output unit) outputs a motor driving command for performing a pan operation or a tilt operation in the direction indicated by the touch-operated directional key. Further, if the center key of the cross key 124 is operated, the main controller 101 outputs a motor driving command for repeating the pan operation or the tilt operation in a predetermined pattern.

In addition, if the imaging start button 125 is touched once, the main controller 101 outputs an imaging start command for simultaneously starting imaging operations of moving images of the plural cameras 10A to 10C which communicate with the smartphone 100. Then, if the imaging start button 125 is touched once again, the main controller 101 outputs an imaging stop command for simultaneously stopping imaging operations of moving images of the plural cameras 10A to 10C.

Next, the types of layouts according to the number of cameras will be described.

Figure 5:
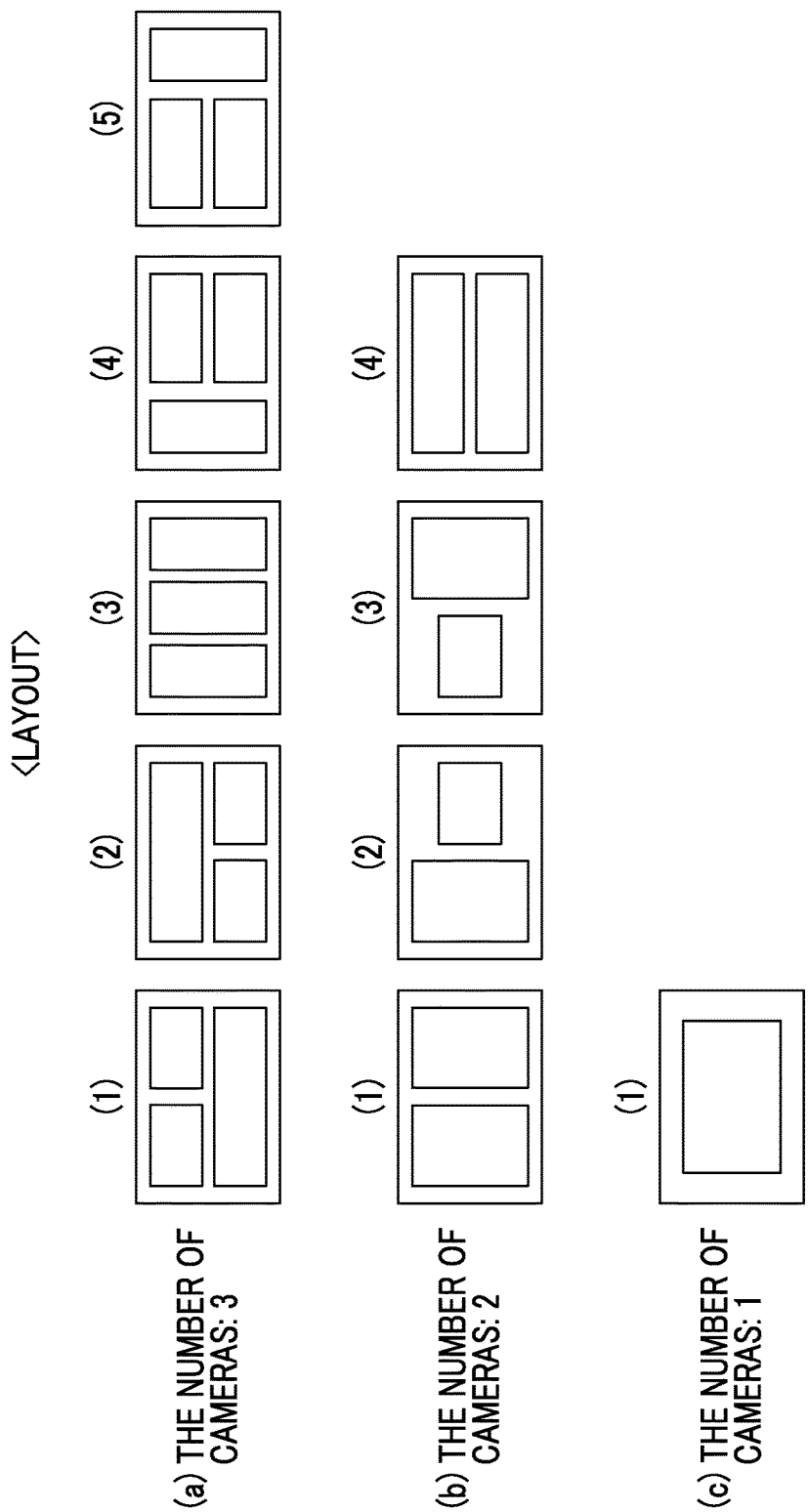
FIGS. 5(a) to 5(c) are diagrams showing layouts capable of being respectively selected in a case where the number of cameras is 3, 2, and 1.

FIGS. 5(*a*) to 5(*c*) are diagrams illustrating layouts capable of being respectively selected in a case where the number of cameras is 3, 2, and 1. Here, the number of cameras refers to the number of cameras for capturing moving images used for moving image editing, and corresponds to the number of moving images used for moving image editing.

In a case where the number of cameras is 3 as shown in FIG. 5(*a*), one layout may be selected from five layouts (1) to (5). Layout buttons displayed in the display region 121B of the display panel 121 in FIG. 4 represent five layouts (1) to (5) shown in FIG. 5(*a*), and relate to a case where Layout (2) is selected.

Layout (1) among five layouts shown in FIG. 5(*a*) represents a layout in which up and down frame positions are reversed, compared with Layout (2), and Layout (3) represents a layout in which three frames which are respectively longitudinally trimmed are disposed in a transverse direction. Layout (4) represents a layout in which one frame which is longitudinally trimmed is disposed at a left-side frame position of the display region 121B and two frames which are transversely trimmed are disposed at right-side up and down frame positions of the display region 121B. Layout (5) represents a layout in which left and right frame positions are reversed, compared with Layout (4).

In a case where the number of cameras is 2 as shown in FIG. 5(*b*), one layout may be selected from four layouts (1) to (4).

Layout (1) among four layouts shown in FIG. 5(*b*) represents a layout in which two frame positions which are respectively longitudinally trimmed are disposed in a transverse direction. Layout (2) represents a layout in which one frame which is longitudinally trimmed is disposed at a left-side frame position of the display region 121B and one frame which is not trimmed is disposed at a right-side frame position of the display region 121B, and Layout (3) represents a layout in which left and right frame positions are reversed, compared with Layout (2). Layout (4) represents a layout in which two frames which are respectively transversely trimmed are disposed in a longitudinal direction.

In a case where the number of cameras is 1 as shown in FIG. 5(*c*), only one Layout (1) for displaying the entirety of one frame is selected (automatically set).

In this way, if the number of cameras is specified and a numeral (layout information) indicating a layout is specified, it is possible to specify a layout of one or plural frames. Here, a numeral indicating a layout is not limited to the number of cameras, and may be set from consecutive numbers. Thus, it is possible to specify a layout of one or plural frames from a numeral indicating a layout.

Next, a method for setting frame positions of frames of one or plural live view images displayed in a selected layout will be described.

FIGS. 7(a) and 7(b) are enlarged views of the display region 121A of the display panel 121 shown in FIG. 4.

As shown in FIG. 7(a), three live view images LV1, LV2, and LV3 are displayed in the display region 121A of the display panel 121 according to a selected layout (in this example, Layout (2) shown in FIG. 5(a)).

Here, it is assumed that the three live view images LV1, LV2, and LV3 are received from the cameras 10A, 10B, and 10C, respectively.

A frame of the live view image LV1 among respective frames of the live view images LV1, LV2, and LV3 displayed according to the layout is a frame subjected to trimming for cutting upper and lower regions of one captured frame and having a transversely long aspect ratio, which is displayed in an upper half region (frame position) of the display region 121A.

Further, frames of the live view images LV2 and LV3 which are not respectively trimmed are displayed in left and right regions (frame positions) of a lower half of the display region 121A. In other words, the live view image LV1 and the live view images LV2 and LV3 have different frame shapes (aspect ratios).

A trimming process of cutting a frame having a transversely long or longitudinally long aspect ratio from one frame of a live view image is generally performed to cut a central portion of one frame, but a frame trimmed at an arbitrary position may be cut from the entirety of one frame by displaying a trimming frame having a transversely long or longitudinally long aspect ratio in a state where the entirety of one frame is displayed and by touching and moving the trimming frame.

In FIG. 7(a), when performing switching between frame positions of the live view images LV1 and LV2 in the layout, a swipe operation of touching the live view image LV2 and moving the live view image LV2 to the frame position of the live view image LV1 is performed. Through the swipe operation, as shown in FIG. 7(b), it is possible to perform switching between the frame positions of the live view images LV1 and LV2.

According to the above-described movement of the frame positions, the live view image LV1 becomes a frame which is not trimmed, and the live view image LV2 becomes a frame which is transversely trimmed. Further, by performing a swipe operation of touching the live view image LV1 and moving the live view image LV1 to the frame position of the live view image LV2, it is possible to perform switching between the frame positions of the live view images LV1 and LV2 as described above.

The number of combinations of frame positions obtained in a case where frame positions of three frames of the live view images LV1 to LV3 are switched in the layout is six as shown in FIG. 6. Hereinafter, it is assumed that any one combination among the six combinations is specified by numbers of frame positions (1) to (6).

In a case where the number of cameras is 3, no matter which layout is selected, there are six combinations of frame positions of three frames. In a case where the number of cameras is 2, the number of combinations of frame positions obtained in a case where frame positions of two frames are switched is two. In a case where the number of cameras is 1, there is one combination of frame positions.

FIGS. 8(a) and 8(b) are enlarged views illustrating the display region 121A of the display panel 121 shown in FIG. 4, and particularly show switching of one live view image in a case where the number of cameras is 1 (one live view image).

In the example shown in FIG. 8(a), a live view image LV1 corresponding to the selected camera 10A is displayed on a large screen, and two live view images LV2 and LV3 corresponding to the cameras 10B and 10C which are in a communication state but are not selected are displayed on small screens. Moving images corresponding to the live view images LV2 and LV3 displayed on the small screens do not become moving image editing targets.

In FIG. 8(a), when switching the selected live view image LV1 to the live view image LV2 (in a case where the live view image LV2 is selected), a swipe operation of touching the live view image LV1 and moving the live view image LV1 to a frame position of the live view image LV2 is performed. Through the swipe operation, as shown in FIG. 8(b), it is possible to switch the selected live view image LV1 to the live view image LV2.

By performing a swipe operation of touching the live view image LV2 and moving the live view image LV2 to a frame position of the live view image LV1, it is possible to perform switching between the frame positions of the live view images LV1 and LV2 (live view image selection) as described above.

In this way, if the number of cameras and a layout are specified and a combination of frame positions (a numeral indicating frame positions) is specified, it is possible to specify which frame position of the layout a frame of a live view image captured by a certain camera is to be disposed at (which camera a live view image is captured by in a case where the number of cameras is 1).

Further, if the number of cameras, a layout, and a frame position are specified as described above, this means that a moving image to be used when editing one moving image from plural moving images captured by plural cameras is selected, and that in a case where plural selected moving images are selected, frame composition (moving image editing) of plural frames is performed based on the specified layout and frame position.

If the number of cameras, a layout, a frame position, and the like are appropriately instructed according to an operation on the touch panel 120 before starting of moving image capturing or during moving image capturing, the main controller 101 acquires operation history information indicating its operation history, creates a log file indicating the operation history information, and records the created log file in the storage unit 150 (operation history recording unit).

FIG. 9 is a diagram showing an example of a log file recorded in the storage unit 150.

In the log file indicating the operation history information shown in FIG. 9, whenever an operation of changing the number of cameras, a layout, a frame position, and the like is performed on the touch panel 120, information indicating a time code (SMPTE time code) indicating its operation time point (a time point after moving image capturing is started), the number of cameras associated with the SMPTE time code, a layout (number indicating layouts of frames corresponding to the number of cameras (see FIG. 5)), a frame position (number indicating frame positions of frames corresponding to the layout (see FIG. 6)) is recorded.

If moving image capturing in the cameras 10A to 10C is terminated, the main controller 101 that functions as a moving image acquisition unit and a moving image editing unit acquires all of moving images (three moving image files) which are captured in synchronization by the respective cameras 10A to 10C through the wireless communication unit 110, and temporarily stores the acquired moving images in the storage unit 150.

The main controller 101 performs moving image editing for automatically creating one moving image based on plural moving images (in this example, three moving images) stored in the storage unit 150 and a log file indicating operation history information. Details of the moving image editing will be described in detail.

<Moving Image Editing Method>

Next, a moving image editing method according to the invention will be described.

Figure 10:
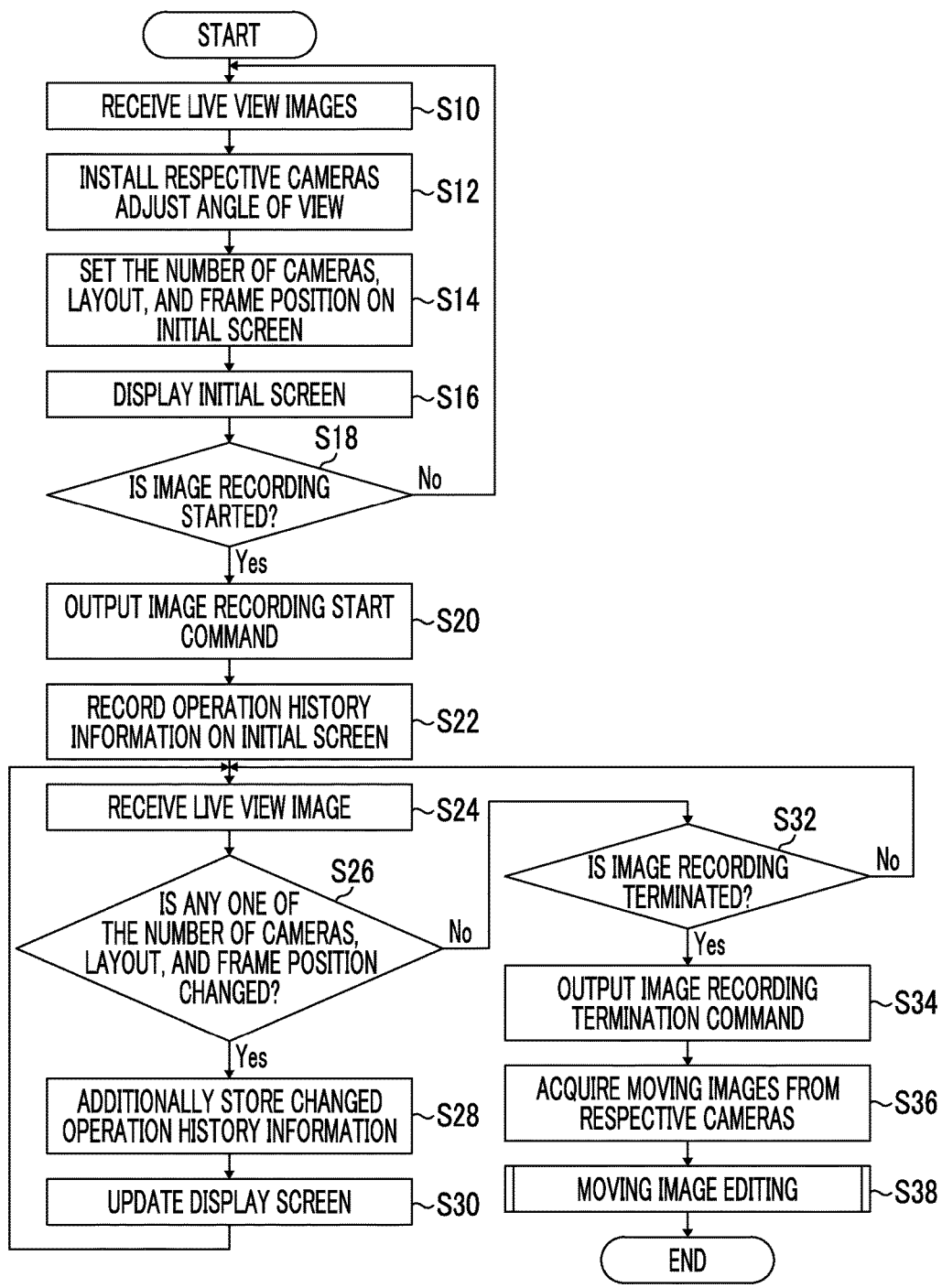
FIG. 10 is a flowchart illustrating an embodiment of a moving image editing method according to the invention.
Figure 11:
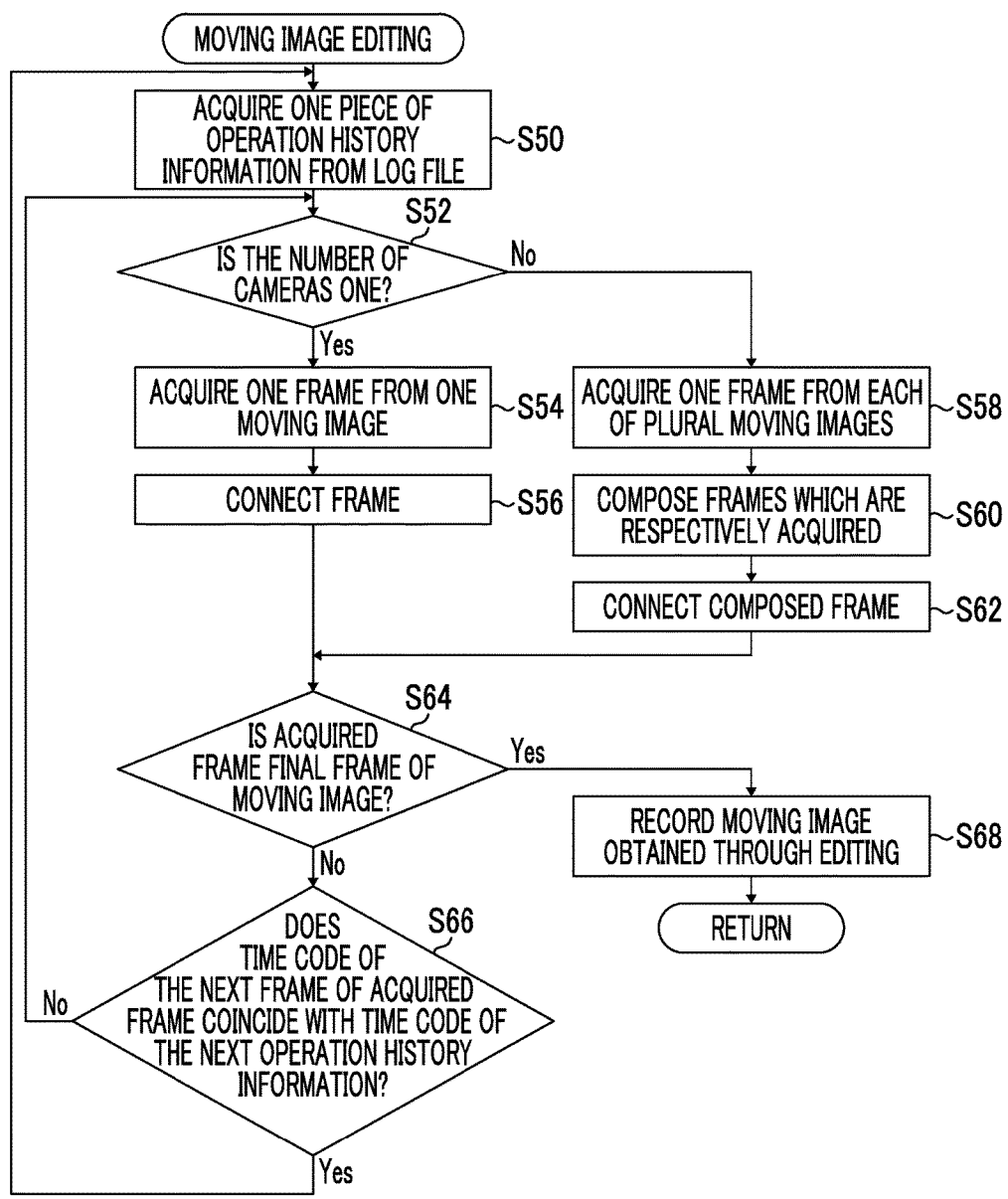
FIG. 11 is a flowchart illustrating details of processing content of a step of performing, moving image editing in FIG. 10.

FIGS. 10 and 11 are flowcharts illustrating embodiments of the moving image editing method according to the invention.

In FIG. 10, the smartphone 100 receives live view images from three cameras 10A, 10B, and 10C, respectively (step S10). The smartphone 100 may cause the received live view images to be individually or simultaneously displayed in the display region 121A of the display panel 121.

Subsequently, adjustment of an installation position and an angle of view of each camera is performed (step S12). In the adjustment of the installation position and the angle of view of each camera, adjustment of an imaging direction, a zoom magnification, or the like of each camera is performed while viewing a live view image displayed in the display region 121A of the display panel 121 of the smartphone 100 or while viewing a live view image displayed in the display unit 61 (see FIG. 2) provided on the rear surface of the camera. Further, in the case of the camera 10A (pan/tilt camera), an imaging direction of the camera 10A may be adjusted by operating the cross key 124 of the smartphone 100 or performing a pan operation or a tilt operation by the pan/tilt mechanism 32 of the camera 10A.

Then, the number of cameras, a layout, and a frame position corresponding to an initial screen (initial one frame) of one moving image for moving image editing are set (step S14). A live view image corresponding to the set initial screen may be displayed in the display region 121A of the display panel 121 (step S16). Thus, it is possible to confirm an image of an initial frame of one moving image for moving image editing.

Subsequently, the main controller 101 determines whether the imaging start button 125 is operated (touched once) (whether image recording is started) (step S18), and if it is determined that the imaging start button 125 is operated (in the case of "Yes"), the main controller 101 simultaneously transmits an imaging command for starting image recording to each of the cameras 10A to 10C (step S20).

If it is determined that the imaging start button 125 is operated (in the case of "Yes"), the main controller 101 stores operation history information (operation history information set in step S14) corresponding to an initial screen in the storage unit 150 (step S22).

Then, the main controller 101 continuously receives live view images (step S24), and determines whether any one of the number of cameras, a layout, and a frame position changes by the touch panel 120 (step S26).

In a case where there is no change (in the case of "No"), it is determined that image recording (moving image capturing) is terminated. Whether the moving image capturing is terminated may be determined according to whether the imaging start button 125 is operated again. In a case where the moving image capturing is not terminated, the procedure transitions to step S24 to perform the processes of steps S24 and S26. The live view images acquired by step S24 are displayed in the display region 121A of the display panel 121.

On the other hand, in step S26, if it is determined that any one of the number of cameras, the layout, and the frame position is changed (in the case of "Yes"), the main controller 101 additionally stores the changed operation history information in the storage unit 150 (step S28), updates a display screen to be displayed in the touch panel 120 (step S30), and then, causes the procedure to transition to step S24.

In this way, by sequentially additionally storing the changed operation history information in step S28, the main controller 101 may create a log file indicating the operation history information as shown in FIG. 9 and may store the result in the storage unit 150.

In step S32, if it is determined that the moving image recording is terminated (in the case of "Yes"), the main controller 101 simultaneously transmits an image recording termination command for terminating the moving image recording to the cameras 10A to 10C (step S34).

Then, the main controller 101 sequentially acquires moving images which are simultaneously captured by the camera 10A to 10C and are recorded in the respective cameras from the respective cameras 10A to 10C, and temporarily stores the result in the storage unit 150 (step S36).

Then, the main controller 101 performs moving image editing based on moving images (hereinafter, moving images captured by the cameras 10A to 10C are referred to as "moving image #1" "moving image #2", and "moving image #3") captured by the cameras 10A to 10C stored in the storage unit 150 and a log file indicating operation history information.

FIG. 11 is a flowchart illustrating processing content of step S38 shown in FIG. 10.

In FIG. 11, the main controller 101 acquires one piece of operation history information in a time-series order of time codes from a log file (step S50). Operation history information which is first acquired corresponds to a time code "0:00:00".

Then, the main controller 101 determines whether the number of cameras is 1 based on information about the number of cameras included in the operation history information (step S52). This process is performed because it is necessary to change a subsequent moving image editing process according to whether the number of cameras is 1.

In step S52, if it is determined that the number of cameras is 1 (in the case of "Yes"), any one moving image among the moving image #1, the moving image #2, and the moving image #3 is specified from information about frame positions, and one frame of the specified moving image is acquired (step S54). In a case where the number of cameras is 1, information about frame positions becomes information indicating one moving image among the moving image #1, the moving image #2, and the moving image #3.

Subsequently, a process of connecting the frame acquired in step S54 to a final frame of a moving image which is currently being edited is performed (step S56).

On the other hand, in step S52, if it is determined that the number of cameras is not 1 (in the case of "No"), plural moving images to be used for moving image editing among the moving image #1, the moving image #2, and the moving image #3 are specified based on information indicating the number of cameras included in the operation history information and frame positions of respective frames in layouts, and one frame at the same time point is acquired from each of the specified plural moving images (step S58).

Subsequently, a process of composing the respective frames acquired in step S58 into one frame based on the information indicating layouts and frame positions (step S60) and connecting the composed frame to the final frame of the moving image which is currently being edited is performed (step S62).

Then, it is determined whether the frame acquired in step S54 or S58 is a final frame of a moving image (step S64).

In step S64, if it is determined that the frame is not the final frame (in the case of "No"), subsequently, it is determined whether a time code of the next frame to the frame acquired in step S54 or S58 coincides with a time code of the next operation history information (step S66). In a case where both the time codes do not coincide with each other (in the case of "No"), the procedure transitions to step S52 to repeat the processes of step S52 to step S66.

In a case where both the time codes coincide with each other (in the case of "Yes"), the procedure transitions to step S50 to acquire the next operation history information from the log file. Further, whenever one piece of operation history information is acquired in the time-series order from the log file, moving image editing (selection of a moving image to be used for moving image editing among the moving image #1, the moving image #2, and the moving image #3, frame composition of a desired layout, or the like) based on the acquired operation history information is performed.

In step S64, if it is determined that the frame acquired in step S54 or step S58 is the final frame of the moving image (in the case of "Yes"), the moving image editing in the main controller 101 is terminated, and one moving image obtained through the editing is recorded in the storage unit 150 (step S68).

FIG. 12 is a diagram showing a relationship between edited moving images and respective frames in the moving images, which particularly shows moving images edited according to the log file indicating the operation history information shown in FIG. 9.

In FIG. 12, the edited moving, images are formed by connecting a moving image 1, a moving image 2, a moving image 3, and so on.

The moving image 1 corresponds to a moving image from a time code "0:00:00" to a time code "0:01:00", and one frame of the moving image 1 is obtained by frame composition corresponding to a case where the number of cameras is 3, a layout is (2), and a frame position is (4).

The moving image 2 corresponds to a moving image from the time code "0:01:00" to a time code "0:05:30", and one frame of the moving image 2 is obtained by frame composition corresponding to a case where the number of cameras is 3, a layout is (3), and a frame position is (1).

The moving image 3 corresponds to a moving image after the time code "0:05:30", and one frame of the moving image 3 corresponds to a frame of the moving image #1 corresponding to a case where the number of cameras is 1, a layout is (1), and a frame position is (1).

In this way, the smartphone 100 records operation history information indicating an operation history using the touch panel 120, to thereby make it possible to generate (automatically edit) one moving image in which the operation history is reflected based on plural moving images captured after moving image capturing is terminated and the operation history information.

<Others>

In this embodiment, a configuration in which all moving images captured after moving image capturing is terminated are acquired from plural cameras is shown, but the invention is not limited thereto, and a configuration in which only moving images to be used for moving image editing is acquired may be used.

Further, in this embodiment, a configuration in which moving image editing is automatically started after moving image capturing is terminated and a moving image which is obtained through the moving imaging editing is recorded is shown, but the invention is not limited thereto, and a configuration in which moving image editing is executed whenever there is an instruction input for reproducing a moving image which is obtained through moving imaging editing and the moving image after the editing is displayed on a display unit may be used. Thus, it is possible to preview a moving image after editing, and to record the moving image after editing as necessary. Further, it is possible to manually correct a part of a moving image which is obtained through automatic moving imaging editing using a known editing device.

Furthermore, the moving image editing device according to the invention is not limited to a smartphone in which a moving image editing program is installed, and may be applied as a moving image editing device in which a moving image editing program is installed in a portable terminal such as a tablet terminal or a portable digital assistant (PDA) having a touch panel, and may be applied as a general-purpose moving image editing device for performing moving image editing according to the invention. Here, the moving image editing device and plural cameras capable of capturing moving images may not be connected only in a wireless manner, but may also be connected in a wireless manner, and the number of cameras to be connected to the moving image editing device is not limited to the embodiments.

The invention is not limited to the above-described embodiments, and may include various modifications in a range without departing from the concept of the invention.

EXPLANATION OF REFERENCES 10A, 10B, 10C: camera
20: imaging unit
22: imaging lens
24: imaging element
30: pan/tilt device
32: pan/tilt mechanism
40: controller
41: signal processor
42: imaging controller
43: lens controller
44: pan/tilt controller
46: camera work controller
50, 110: wireless communication unit
60, 140: operation unit
62: memory
100: smartphone
101: main controller
120: display input unit (touch panel)
121: display panel
122: operation panel
150: storage unit
151: internal storage unit
152: external storage unit

What is claimed is:
1. A moving image editing device comprising:
a live view image acquisition unit that is connected to a plurality of cameras capable of performing moving image capturing in a wireless or wired manner, and acquires one or a plurality of live view images from the plurality of cameras;

a display unit that displays the one or plurality of live view images acquired by the live view image acquisition unit;

an operation unit that performs switching between live view images displayed on the display unit by a manual operation;

an operation history recording unit that records operation history information indicating an operation history in the operation unit; and a moving image editing unit that performs moving image editing for automatically creating, after the moving image capturing in the plurality of cameras is terminated, one moving image based on a plurality of moving images respectively captured by the plurality of cameras and the operation history information recorded in the operation history recording unit.

2. The moving image editing device according to claim 1, further comprising:

a moving image recording unit that records one moving image which is obtained through the moving imaging editing in the moving image editing unit.

3. The moving image editing device according to claim 1, wherein the moving image editing unit performs the moving image editing for automatically creating the one moving image whenever a moving image is to be reproduced, and causes the moving image obtained through the moving image editing to be displayed on the display unit.

4. The image editing device according to claim 1, wherein the operation unit receives an operation of selecting a live view image corresponding to one moving image to be used in the moving image editing unit, among the plurality of moving images respectively captured by the plurality of cameras, wherein the operation history information includes a time code at the time of the operation and information for specifying one moving image to be used in the moving image editing unit, and wherein the moving image editing unit includes moving image editing for selecting any one moving image among the plurality of moving images respectively captured by the plurality of cameras based on the operation history information and connecting the selected moving image.

5. The image editing device according to claim 1, wherein the operation unit receives an operation of specifying two or more moving images to be simultaneously displayed among the plurality of moving images respectively captured by the plurality of cameras and specifying a layout that represents frame shapes and frame positions of respective frames of the specified two or more moving images, wherein the display unit displays live view images corresponding to the two or more moving images specified by the operation unit in the specified layout, wherein the operation history information includes information indicating the two or more moving images specified by the operation unit and layout information indicating the specified layout, and wherein the moving image editing unit includes moving image editing for specifying two or more moving images to be simultaneously displayed among the plurality of moving images respectively captured by the plurality of cameras based on the operation history information and composing the specified two or more moving images according to the specified layout.

6. The moving image editing device according to claim 5, wherein the display unit and the operation unit are configured by a touch panel that includes a display panel and an operation panel that detects coordinates touched on the display panel, and the display panel includes a region where the live view image is displayed, and a region where an operation icon button is displayed, and wherein the operation icon button includes a layout button for selecting the layout.

7. The moving image editing device according to claim 5, wherein the display unit and the operation unit are configured by a touch panel that includes a display panel and an operation panel that detects coordinates touched on the display panel, and the display panel includes a region where the live view image is displayed, and wherein the operation unit gives an instruction for performing switching between frame positions in a layout of the specified two or more moving images based on a swipe operation between respective frame regions in which the live view images are displayed.

8. The moving image editing device according to claim 1, further comprising:

a moving image acquisition unit that acquires all of the plurality of moving images from the plurality of cameras or acquires only moving images to be used for the moving image editing among the plurality of moving images from the plurality of cameras based on the operation history information, after the moving image capturing in the plurality of cameras is terminated.

9. The moving image editing device according to claim 1, wherein the display unit and the operation unit are configured by a touch panel that includes a display panel and an operation panel that detects coordinates touched on the display panel, and the display panel includes a region where the live view image is displayed and a region where an operation icon button is displayed.

10. The moving image editing device according to claim 1, wherein the plurality of cameras includes a pan/tilt camera, and wherein the moving image editing device further comprises a pan/tile operation unit that operates the pan/tilt camera by remote control, and a driving command output unit that outputs a driving command to the pan/tilt camera according to an operation in the pan/tilt operation unit.

11. A moving image editing method comprising:

a step of acquiring one or a plurality of live view images from a plurality of cameras capable of performing moving image capturing in a wired or wireless manner;

a step of displaying the acquired one or plurality of live view images on a display unit;

a step of performing switching between live view images which are being displayed on the display unit by a manual operation in an operation unit;

a step of recording operation history information indicating an operation history in the operation unit while the moving image capturing is being performed in the plurality of cameras in an operation history recording unit; and a step of performing moving image editing for automatically creating, after the moving image capturing in the plurality of cameras is terminated, one moving image based on a plurality of moving images respectively captured by the plurality of cameras and the operation history information recorded in the operation history recording unit.

12. The moving image editing method according to claim 11, further comprising:
a step of recording one moving image which is obtained through the moving imaging editing in a moving image recording unit.

13. The moving image editing method according to claim 11,
wherein the step of performing the moving image editing includes performing the moving image editing for automatically creating the one moving image whenever a moving image is to be reproduced and causing the moving image obtained through the moving image editing to be displayed on the display unit.

14. The moving image editing method according to claim 11,
wherein the manual operation in the operation unit includes an operation of selecting a live view image corresponding to one moving image to be used for the moving image editing, among the plurality of moving images respectively captured by the plurality of cameras,
wherein the operation history information includes a time code at the time of the operation and information for specifying one moving image to be used in the moving image editing unit, and
wherein the step of performing the moving image editing includes moving image editing for selecting any one moving image among the plurality of moving images respectively captured by the plurality of cameras based on the operation history information and connecting the selected moving image.

15. The moving image editing method according to claim 11,
wherein the manual operation in the operation unit includes an operation of specifying two or more moving images to be simultaneously displayed among the plurality of moving images respectively captured by the plurality of cameras and specifying a layout that represents frame shapes and frame positions of respective frames of the specified two or more moving images,
wherein the step of displaying the live view images on the display unit includes displaying live view images corresponding to the two or more moving images specified by the operation unit in the specified layout,
wherein the operation history information includes information indicating the two or more moving images specified by the operation unit and layout information indicating the specified layout, and
wherein the step of performing the moving image editing includes moving image editing for specifying two or more moving images to be simultaneously displayed among the plurality of moving images respectively captured by the plurality of cameras based on the operation history information and composing the specified two or more moving images according to the specified layout.

16. A computer readable non-transitory recording medium having a moving image editing program that causes a portable terminal that includes a wireless communication unit, a display unit, an operation unit, a computer to function as a moving image editing device of a plurality of moving images captured by a plurality of cameras capable of performing moving image capturing, the program causing the computer to realize:
a function of acquiring one or a plurality of live view images from the plurality of cameras in a wired or wireless manner;
a function of displaying the acquired one or plurality of live view images on a display unit;
a function of performing switching between live view images displayed on the display unit by a manual operation in an operation unit;
a function of recording operation history information indicating an operation history in the operation unit; and
a function of performing moving image editing for automatically creating, after the moving image capturing in the plurality of cameras is terminated, one moving image based on a plurality of moving images respectively captured by the plurality of cameras and the operation history information recorded in the operation history recording unit.

* * * * *